United States Patent [19]

Vertegaal

[11] 4,060,382

[45] Nov. 29, 1977

[54] METHOD AND DEVICE FOR DYE TRANSFER PRINTING

[75] Inventor: Jacobus Gerardus Vertegaal, Boxmeer, Netherlands

[73] Assignee: Stork Brabant B.V., Boxmeer, Netherlands

[21] Appl. No.: 699,208

[22] Filed: June 23, 1976

[30] Foreign Application Priority Data

July 2, 1975 Netherlands ......................... 7507902

[51] Int. Cl.$^{2}$ ......................... D06P 5/20; B41M 5/26; H01T 19/00; H02N 1/00

[52] U.S. Cl. ...................................... 8/2.5 A; 68/5 D; 101/470; 250/318; 250/325; 361/228

[58] Field of Search ............... 250/317, 318, 319, 324, 250/325, 326; 317/262 A, 262 E; 101/470; 8/2.5 A; 68/5 D

[56] References Cited

U.S. PATENT DOCUMENTS

| | | | |
|---|---|---|---|
| 1,482,356 | 1/1924 | Dausmann | 101/181 |
| 3,660,656 | 5/1972 | Frank et al. | 317/262 A |
| 3,677,640 | 7/1972 | Nakatani et al. | 317/262 E |
| 3,892,614 | 7/1975 | Levy | 317/262 E |
| 3,944,355 | 3/1976 | Matkan | 317/262 A |

FOREIGN PATENT DOCUMENTS

| | | | |
|---|---|---|---|
| 1,284,534 | 12/1968 | Germany. | |
| 1,387,417 | 3/1975 | United Kingdom | 101/470 |

*Primary Examiner*—Clyde I. Coughenour
*Attorney, Agent, or Firm*—Watson, Cole, Grindle & Watson

[57] ABSTRACT

A method and device for transferring from a dye supporting strip a design to a textile web under the action of heat and a subatmospheric pressure, the strip being pressed against the web by a difference in electrostatic charge. A charging device is used adapted to direct a very narrow beam of electrons upon the strip.

3 Claims, 2 Drawing Figures

METHOD AND DEVICE FOR DYE TRANSFER PRINTING

BACKGROUND OF THE INVENTION

The invention relates to a method for transferring within a housing substances from a support to a web under the action of heat and subatmospheric pressure. This support and web are pressed against each other by a different electrostatic charge of support and web along at least the beginning of a common path, whereupon both support and web are conveyed over a supporting surface in the effective path. Such a method is known from German Patent specification No. 1,284,534 and is mostly based on a paper design- or dye support and a textile web.

An advantage of the electrostatic adherence of the web (the cloth) and the support is a consequence of the minor compressive force, whereby the "grip" of the cloth is retained unaltered while an excellent printing is obtained due to a minor spacing between support and web. On account of the use of subatmospheric pressure additional advantages are obtained, like the possibility of using lower temperatures and obtaining better penetration and dye transfer. This is because less air molecules are to be found between the support and web.

This know method presents the disadvantages that a considerable process time is required which could, however, be reduced if a lower subatmospheric pressure were permissible. It has been found, however, that when the subatmospheric pressure is reduced, the electrostatic adherence decreases rapidly, probably owing to the less proper functioning of the electrostatic charge and the fast disappearance of the difference of potential between support and web.

SUMMARY OF THE INVENTION

The invention aims to provide a method in which the adherence is adequate and remains so, in spite of the presence of a considerable underpressure. The invention proposes to direct the electrostatic charge to the supporting surface in very narrow and very moderately converging beams, while maintaining an electrical insulation of the support and the web with respect to the housing. Consequently, the random losses on charging the web and the support are reduced, while furthermore the charge once applied will keep up longer.

A further object of the invention relates to a device for performing the aforementioned method, comprising a housing with means for generating and maintaining an underpressure, members for jointly conveying a dye support and a web over the supporting surface of a path and means for heating the support and/or the web and at least one charging device directed to the support and web. According to the invention each charging device is provided with a screen, limiting the delivery of electrons to a narrow beam directed to the support and web; the supporting surface being electrically insulated with respect to the housing. It suffices when only the supporting surface is insulated and the other constructive parts (whether moving or not) of the supporting surface are directly connected with the support of the device.

SURVEY OF THE DRAWINGS

FIG. 1 is a diagrammatic side elevation of the device;
FIG. 2 is a cross-section through a charging device.

DESCRIPTION OF A PREFERRED EMBODIMENT

Figure 1:
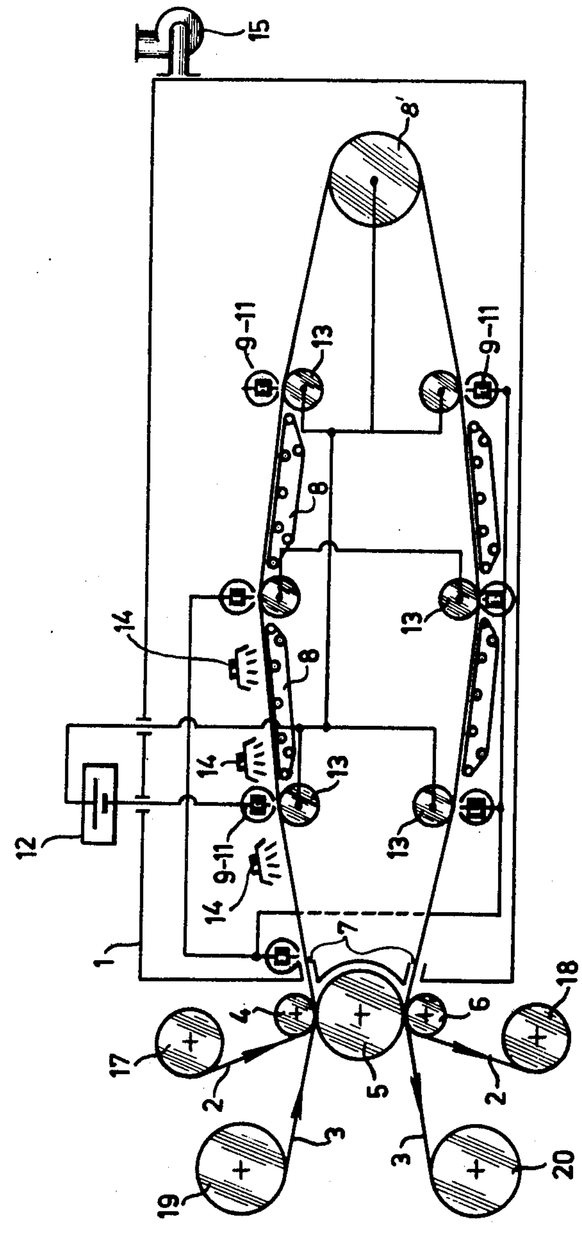

The device according to FIG. 1 consists of a housing 1, in which the transfer process is carried out. A supporting strip or band 2 of paper provided with the dye(s) to be transferred is introduced into the housing 1, and likewise a textile web 3 to which the dye stuffs, whether in a particular design or not, should be transferred is also introduced into the housing. The support 2 and the web 3 to be supplied to the housing 1 are pressed against each other by a pair of rollers 4, 5. The support 2 and web 3 leaving the housing 1 are conveyed past a pair of rollers 5 and 6. In the embodiment of FIG. 1 the support 2 and web 3 are introduced into the housing by way of a sluice 7 and leave the housing finally via a second sluice 7. The combination 2 and 3 is conveyed over a supporting surface 8 in the effective path. Half the circumference of the guide roller 8' constitutes a part of the path along which the paper dye stuff support 2 and the textile web 3 mutually advance.

Figure 2:
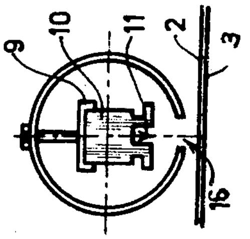

Means are provided along the common path for achieving a difference of potential and accordingly electrostatically charging the support 2 and the web 3. These means consist of some members like charging devices or so-called charging sprayers which comprise a mounting 9 with an insulating block 10 in which a woven metal gauze is embedded, the lower weft threads of which are removed. The remaining warp threads 11 are turned to the support 2, see in particular FIG. 2. These charging sprayers 9–11 are connected with the negative pole of a voltage generator 12. The other, second, members consist of metal rollers 13 which are connected with the positive pole. Thus, a difference of potential is created whereby the web 3 gets a charge different from that of the support 2. As a consequence the support and the web "adhere" to each other and also to the supporting surface 8. In this manner a composite unit is formed which can be moved along an arbitrary path.

Means 14 are disposed within the housing 1 for heating the support 2 and means 15 for maintaining subatmospheric pressure within the housing. Each charging sprayer 9–11 is provided with a screen (see FIG. 2). This screen consists of a tubular section with a narrow slit 16 delimiting the delivery of electrons to a narrow beam directed to the support and the web 2 and 3. The supporting surface 8 is electrically insulated with respect to the housing 1.

By adjusting a tension ranging, e.g., from 5 to 10 kilovolt, in the generator 12, the paper support 2 is negatively charged with respect to the textile web 3, whereby a mutual attraction is produced. It has been found by experiments that under these circumstances compressive stresses of 20 to 25 g per $cm^2$ are possible. The roller pair 5 and 6 may be grounded in order to remove any residual charge from the spent support 2 and the printed web 3. The support 2 is supplied by a roll 17 and the spent material is wound on a roller 18. The textile web 3 is supplied by a roll 19 and is conveyed in the printed condition to a roller 20. In spite of the subatmospheric pressure used in the housing, the charge on the support and the web can be returned thereon. The directed beams of electrons and the insulated supporting surface contribute thereto. It should be noted that the supporting surface can also consist of a drum with a large diameter.

What we claim is:

1. A method for transferring a dye design from a moving support strip to a textile web which comprises:
   pressing the surface of the moving support strip which has the dye design thereon in contact with the textile web;
   passing said contacting support strip and said textile web in a common path through an enclosed housing;
   evacuatign said housing to create a subatmospheric pressure therein;
   heating the surface of said moving support strip opposite to the surface in contact with said textile web while in said housing to aid said dye design transfer;
   passing the surface of said textile web opposite to the surface in contact with said support strip over a charged supporting surface while in said housing, and at the same time directing a very narrow and converging beam of electrostatic charge opposite in character to the charge on said supporting surface against the surface of the moving support strip opposite to said textile web in order to produce an electrical adherance between the moving support strip and textile web and thereby aid in dye design transfer.

2. The method of claim 1 wherein said moving support strip and said textile web are maintained in electrically insulated condition with respect to said housing.

3. A device for transferring a dye design from a moving support strip to a textile web, said device comprising:
   a housing;
   means connected to said housing for evacuating said housing;
   means for conveying the moving support strip and the textile web in joint contact into, through, and out of the housing;
   means positioned within the housing for heating the surface of the support strip opposite to the surface thereof in contact with the textile web;
   a charged support surface positioned within the housing over which the surface of the textile web opposite to the surface in contract with the support strip passes;
   at least one charging device positioned within the housing functioning to direct a beam of particles having a charge opposite in character to the charge on said support surface against the surface of the support strip opposite to the surface in contact with the textile web at a point where said textile web is supported by said support surface, said charging device comprising a rod encircled by a tubular section having a narrow slit for allowing a converging beam of particles therethrough;
   said housing being provided along its inner wall with electrical insulation, said supporting surface being positioned in an electrically insulated fashion with respect to the housing.

* * * * *